United States Patent
Bloomfield et al.

[11] Patent Number: 5,989,741
[45] Date of Patent: Nov. 23, 1999

[54] ELECTROCHEMICAL CELL SYSTEM WITH SIDE-BY-SIDE ARRANGEMENT OF CELLS

[75] Inventors: David P. Bloomfield, Boston, Mass.; Shoibal Banerjee, Raleigh, N.C.; Olga Y. Polevaya, Needham, Mass.; James J. Ferris, Marlborough, Mass.

[73] Assignee: E.I. du Pont de Nemours and Company, Wilmington, Del.

[21] Appl. No.: 09/093,319

[22] Filed: Jun. 8, 1998

Related U.S. Application Data

[60] Provisional application No. 60/049,116, Jun. 10, 1997, and provisional application No. 60/049,672, Jun. 16, 1997.

[51] Int. Cl.$^6$ ..................................................... H01M 8/10
[52] U.S. Cl. ............................... 429/32; 429/18; 429/41; 429/152; 429/243; 429/244; 29/623.1; 29/623.3; 29/746; 29/747; 29/749; 156/157; 156/182; 156/196; 156/288; 156/304.1
[58] Field of Search ................... 429/33, 18, 31, 429/32, 41, 123, 152, 243, 244; 29/623.3, 746, 747, 748, 749, 623.1; 156/90, 157, 182, 196, 272.2, 285, 288, 304.1

[56] References Cited

U.S. PATENT DOCUMENTS

| | | | |
|---|---|---|---|
| 4,738,741 | 4/1988 | Mc Michael | 156/235 |
| 4,752,370 | 6/1988 | Mc Michael et al. | 204/283 |
| 4,889,577 | 12/1989 | Mc Michael et al. | 156/281 |
| 5,039,389 | 8/1991 | Mc Michael | 204/282 |
| 5,190,834 | 3/1993 | Kendall | 429/31 |
| 5,783,324 | 7/1998 | Binder et al. | 429/33 |
| 5,861,221 | 1/1999 | Ledjeff et al. | 429/33 |
| 5,863,672 | 1/1999 | Ledjeff et al. | 429/33 |

OTHER PUBLICATIONS

O. Polevaya and D. Bloomfield, Advanced Lightweight Fuel Cell Stacks, Proceedings of the 37th Power Sources Conference, 69–72, Jun. 17–20, 1996.

R. Nolte, A. Kolbe, K. Ledjeff–Hey, High Voltage–Small Current Fuel Cell Concept Based on Functional Membranes, Proceedings of the 37th Power Sources Conference, 77–80, Jun. 17–20, 1996.

Army SBIR Award, Topic #:A94–071, Extremely Lightweight Fuel Cells Stacks, Abstract, After Jun. 28, 1996.

Army SBIR Award, Topic #A94–071, Extremely Lightweight Fuel Cells Stacks, Abstract, After Mar. 15, 1995.

*Primary Examiner*—Bruce F. Bell

[57] ABSTRACT

An electrochemical cell system including an anode compartment and a cathode compartment separated by a membrane and electrode structure. This structure has an anode surface with a plurality of anodes in a side-by-side arrangement exposed to the anode compartment and a cathode surface with a plurality of cathodes in a side-by-side arrangement exposed to the cathode compartment. The anodes and cathodes are separated by a layer of ion exchange polymer and register with each other so that opposing pairs of anodes and cathodes form cells. The membrane and electrode structure further includes a plurality of current collector screens. The current collector screens have an anode contact area in contact with the anode, a cathode contact area in contact with the cathode and a feed through area extending between cells and crossing from the anode contact area to the cathode contact area to connect the anode and cathode of adjacent cells. The invention provides a polymer electrolyte membrane electrochemical cell system which can be less complicated, lighter in weight and/or is easier to manufacture that existing stack designs.

33 Claims, 4 Drawing Sheets

ELECTROCHEMICAL CELL SYSTEM WITH SIDE-BY-SIDE ARRANGEMENT OF CELLS

RELATED APPLICATIONS

This application claims the benefit of U.S. Provisional application No. 60/049,116, filed Jun. 10, 1997 and U.S. Provisional application No. 60/049,672, filed Jun. 16, 1997. +gi

GOVERNMENT RIGHTS

The Government has rights in this invention pursuant to U.S. Army Research Laboratory Contract No. DAAL01-95-C-3507 and Contract No. DAAL01-96-C-36.

FIELD OF THE INVENTION

The present invention relates to electrochemical cells and more particularly relates to a polymer electrolyte membrane electrochemical cell with a side-by-side arrangement of cells.

BACKGROUND OF THE INVENTION

Polymer electrolyte membrane (PEM) electrochemical cells employ a membrane of an ion exchange polymer which serves as a physical separator between the anode and cathode while also serving as an electrolyte. These cells can be operated as electrolytic cells for the production of electrochemical products or they may be operated as fuel cells for the production of electrical energy. Membranes of highly fluorinated polymers such as perfluorinated sulfonic acid polymer membranes are particularly well-suited for use in such cells due to excellent chemical resistance, long life, and high ionic conductivity.

PEM electrochemical cells typically employ a bipolar plate "stack" design in which a number of conductive bipolar plates in a parallel arrangement serve as current collectors and separators for adjacent cells. For $H_2/O_2$ fuel cells and other cells using gaseous reactants, the bipolar plates usually also define a number of flow channels for distribution of the hydrogen and the air or oxygen to a porous gas diffusion backing in contact with the electrodes of the cells. Such cell stacks also include rigid end plates and tie rods which maintain the stack in compression. Consequently, the stacks and associated fuel and oxygen manifolds are usually complicated, expensive and difficult to manufacture. Moreover, for most portable and transportation applications, the weight contributed by the bipolar plates, the end plates and the tie rods is higher than is desired.

SUMMARY OF THE INVENTION

The invention provides a polymer electrolyte membrane electrochemical cell system which can be less complicated, lighter in weight and/or is easier to manufacture that existing stack designs. An electrochemical cell system in accordance with the invention includes an anode compartment and a cathode compartment separated by a membrane and electrode structure. The membrane and electrode structure has an anode surface with a plurality of anodes in a side-by-side arrangement exposed to the anode compartment and a cathode surface with a plurality of cathodes in a side-by-side arrangement exposed to the cathode compartment. The anodes and cathodes include electrically-conductive catalyst particles and are separated by a layer of ion exchange polymer and register with each other so that opposing pairs of anodes and cathodes form cells. The membrane and electrode structure further includes a plurality of current collector screens. The current collector screens have an anode contact area in contact with the anode, a cathode contact area in contact with the cathode and a feed through area extending between cells and crossing from the anode contact area to the cathode contact area to connect the anode and cathode of adjacent cells.

The invention also provides a process for making a membrane and electrode structure comprising:

positioning conductive screens and sheets of thermoplastic ion exchange polymer precursor so that the screens overlap an adjacent screen to define overlapped areas and so that the sheets are positioned between adjacent screens at the overlapped areas;

pressing the screens and sheets while heating to a temperature sufficient to soften the polymer so that the screens and the polymer sheets become attached and form a unitary structure having first and second surfaces, the screens at the overlapped areas being separated by the ion exchange polymer precursor;

hydrolyzing the ion exchange polymer precursor; and forming a plurality of electrodes of electrically-conductive catalyst particles in a side-by-side arrangement on the first and second sides of the unitary structure at the overlapped areas, the electrodes on the first side registering with the electrodes on the second side to provide opposing electrode pairs.

DETAILED DESCRIPTION

Ion Exchange Polymer

Polymers for use in accordance with this invention may be any number of ion exchange polymers including polymers with cation exchange groups that are preferably selected from the group consisting of sulfonate, carboxylate, phosphonate, imide, sulfonimide and sulfonamide groups. Various known cation exchange polymers can be used including polymers and copolymers of trifluoroethylene, tetrafluoroethylene, styrene-divinyl benzene, α,β,β-trifluorstyrene, etc., in which cation exchange groups have been introduced.

Polymers for use in accordance with the present invention are preferably highly fluorinated ion-exchange polymers having sulfonate ion exchange groups. "Highly fluorinated" means that at least 90% of the total number of univalent atoms in the polymer are fluorine atoms. Most preferably, the polymer is perfluorinated. The term "sulfonate ion exchange groups" is intended to refer to either to sulfonic acid groups or salts of sulfonic acid groups, preferably alkali metal or ammonium salts. Most preferably, the ion exchange groups are represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. For applications where the polymer is to be used for proton exchange, the sulfonic acid form of the polymer is preferred, i.e., where X is H in the formula above.

Preferably, the polymer comprises a polymer backbone with recurring side chains attached to the backbone with the side chains carrying the cation exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride (—$SO_2F$), which can be subsequently hydrolyzed to a sulfonate ion exchange group. For example, copolymers of a first fluorinated vinyl monomer together with a second fluorinated vinyl monomer having a sulfonyl fluoride group (—$SO_2F$) can be used. Possible first monomers include tetrafluoroethylene (TFE), hexafluoropropylene, vinyl fluoride, vinylidine fluoride, trifluorethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain which does not interfere with the ion exchange function of the sulfonate ion exchange group. Additional monomers can also be incorporated into these polymers if desired.

A class of preferred polymers for use in the present invention include a highly fluorinated, most preferably perfluorinated, carbon backbone and the side chain is represented by the formula —(O—$CF_2CFR_f)_a$—O—$CF_2CFR'_fSO_3X$, wherein $R_f$ and $R'_f$ are independently selected from F, Cl or a perfluorinated alkyl group having 1 to 10 carbon atoms, a=0, 1 or 2, and X is H, Li, Na, K or $N(R_1)(R^2)(R^3)(R^4)$ and $R_1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula —O—$CF_2CF(CF_3)$—O—$CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$O—$CF_2CF_2SO_2F$, perfluoro (3,6-dioxa-4-methyl-7-octenesulfonyl fluoride) (PDMOF), followed by conversion to sulfonate groups by hydrolysis of the sulfonyl halide groups and ion exchanging if needed to convert to the desired form. One preferred polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and acid exchange if needed.

In this application, "ion exchange ratio" or "IXR" is defined as number of carbon atoms in the polymer backbone in relation to the cation exchange groups. A wide range of IXR values for the polymer are possible. Typically, however, the IXR range used for the ion exchange polymer for this invention is usually about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—$CF(CF_3)$—O—$CF_2$—$CF_2$—$SO_3H$ (or a salt thereof), the equivalent weight range which corresponds to an IXR of about 7 to about 33 is about 700 EW to about 2000 EW. IXR for this polymer can be related to equivalent weight using the following formula: 50 IXR+344=EW. While generally the same IXR range is used for sulfonate polymers disclosed in U.S. Pat. Nos. 4,358,545 and 4,940,525, the equivalent weight is somewhat lower because of the lower molecular weight of the monomer unit containing a cation exchange group. For the IXR range of about 7 to about 33, the corresponding equivalent weight range is about 500 EW to about 1800 EW. IXR for this polymer can be related to equivalent weight using the following formula: 50 IXR+178=EW.

IXR is used in this application to describe either hydrolyzed polymer which contains ion exchange groups or unhydrolyzed polymer which contains precursor groups which will subsequently be converted to the ion exchange groups during the manufacture of the membranes.

The highly fluorinated sulfonate polymer used in the accordance with the invention preferably has an ion exchange ratio of about 8 to about 23, preferably about 9 to about 14 and most preferably about 10 to about 13.

Current Collector Screens

The current collectors screens in the electrochemical cells in accordance with the present invention operate to conduct electrical current produced at the electrodes by the cells in the system. The screens can be made of a variety of materials and in a variety of forms provided that they perform this function. Preferably, the screens are flexible for ease of manufacturing and for versatility of during use, i.e., to accommodate shaping the membrane and electrode structure into cylindrical, coiled or other forms.

Regardless of the type of screen, the screen has pores which enable ionic conduction between the membrane at one side of the screen and the electrode at the other side of the screen. Preferred pore sizes are about 250 μm to about 750 μm. In a preferred form of the invention, the current collector screens have an open area of about 55% to about 65%.

To minimize voltage drop in the electrochemical cell system due to electrical resistance, the current collector screens are preferably highly conductive. Preferably, the screens are made of metal. Suitable types of metal screens include slit and expanded metal, perforated metal, stamped metal, and photoetched metal. Most preferably, slit and expanded titanium sheets are used such as those available commercially from Exmet Corporation, Naugatuck, Conn. under the trademark EXMET®. Preferably, the expanded titanium metal sheets have a coating of titanium nitride.

Membrane and Electrode Structure

Figure 1:
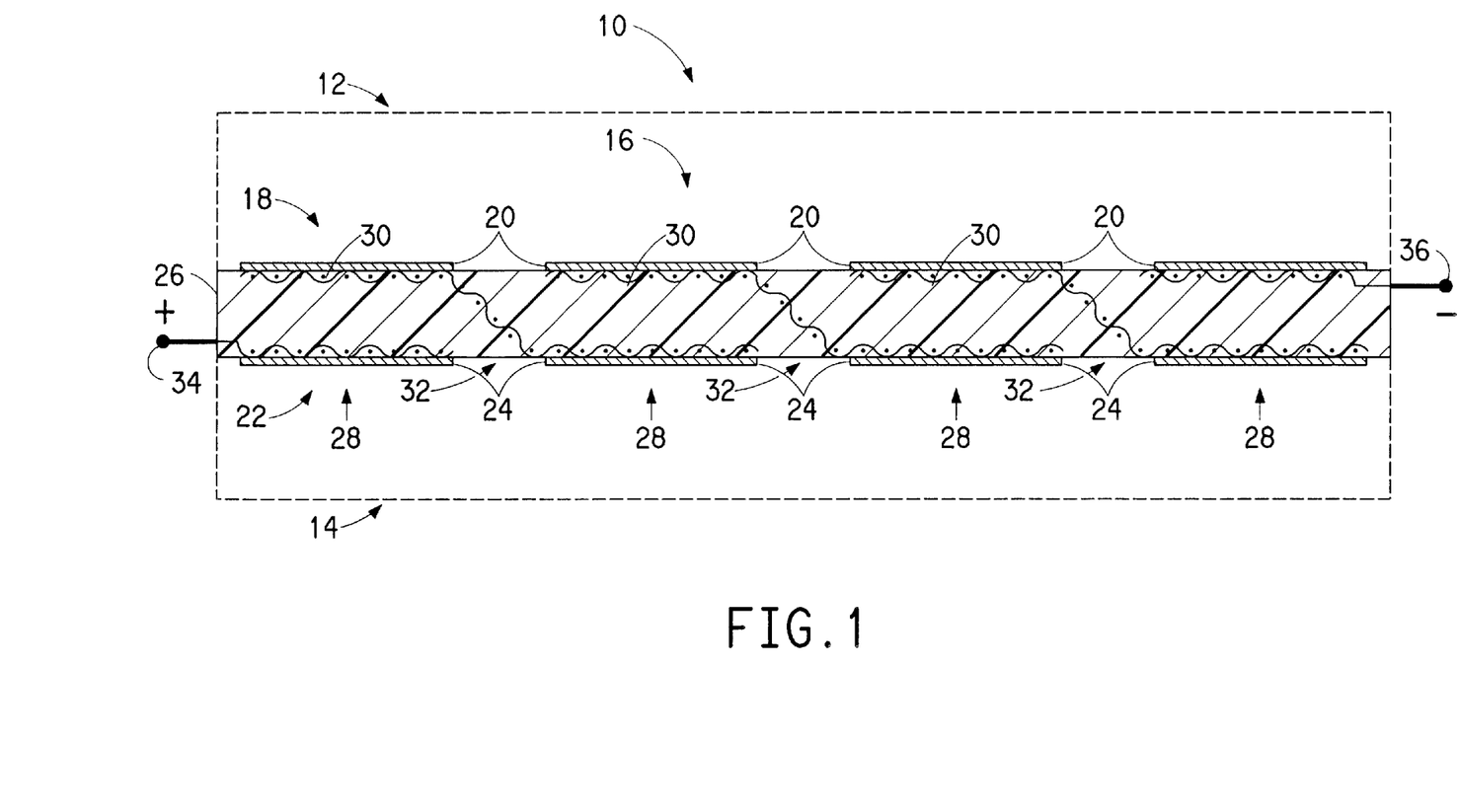
FIG. 1 is a schematic cross-sectional view of a preferred electrochemical cell in accordance with the invention.

With reference to FIG. 1, a preferred electrochemical cell system 10 in accordance with the invention is illustrated schematically in cross-section. The particular cell illustrated is operable as a fuel cell employing a gaseous fuel such as hydrogen. The cell system 10 has an anode compartment 12 to which the fuel is supplied from a source (not shown) and a cathode compartment 14 to which air or oxygen is supplied. While an enclosed cathode compartment 14 depicted in FIG. 1 such as would be desirable for use with oxygen and/or when humidified air is used, it will be understood that when air without humidification is employed the compartment may be essentially open to the air.

Cell system 10 includes an membrane and electrode structure 16 which serves as separator between anode compartment 12 and the cathode compartment 14. For the purposes of illustration, the thickness of the structure 16 has been increased for clarity.

The membrane and electrode structure 16 has an anode surface 18 with a plurality of anodes 20 in a side-by-side arrangement exposed to the anode compartment 12 and a cathode surface 22 with a plurality of cathodes 24 in a side-by-side arrangement exposed to the cathode compartment 14. The anodes 20 and cathodes 24 are separated by a layer of ion exchange polymer 26 (of the type described previously) and register with each other so that opposing pairs of anodes and cathodes form cells 28. In the embodiment depicted, four cells are provided with anodes and cathodes registering by the anodes by being above and in alignment with the cathodes.

The membrane and electrode structure 16 include a plurality of current collector screens 30 (of the type described previously) which conduct current in the cell system. The screens 30 perform the same electrical function as bipolar plates a conventional stack configuration, i.e., they connect between the anode and cathodes of adjacent cells and thereby electrically connect the cells in series. More specifically, the current collector screens have an anode contact area in contact with the anode 20 of a cell, a cathode contact area in contact with the cathode 24 of cell and a feed through area extending between cells and crossing from the anode contact area. At the feed through area designated by the number 32, the current collector 30 screen passes through the ion exchange layer. Preferably, as depicted in FIG. 1, the ion exchange polymer 26 interpenetrates the screens at the feed through areas to form a barrier to prevent the bulk flow of materials, i.e., fuel or oxygen, between the anode compartment and the cathode compartment. In another preferred form of the invention, the current collector screens provide at least a single layer of reinforcement to the membrane and electrode sheet over at least about 93% of the area of the sheet. Preferably, a single current collector screen is the sole electrical conductor between adjacent cells.

At the terminal portions of the cell system, a positive terminal 34 and a negative terminal 36 are provided for supplying current to an external circuit. The positive terminal is connected to a current collector screen 30 at the end of the membrane an electrode structure. This current collector screen, since it is at the end of the structure only has a cathode contact area and does not cross over and contact an anode. Similarly, the negative terminal 36 is connected to a current collector screen 30 at the end of the membrane an electrode structure which only has an anode contact area and does not cross over and contact a cathode.

The anodes 20 and cathodes 24 are made from well-known electrically conductive, catalyst particles such as a platinum group metal or metal oxide, preferably supported on carbon particles. The anodes and cathodes preferably employ a polymer which serves as a binder for the catalyst particles. For example, using a perfluorinated sulfonic acid polymer ion exchange layer with a platinum group metal or metal oxide catalyst, the binder polymer can also be perfluorinated sulfonic acid polymer. In the catalyst layers 22 and 30, the particles are preferably uniformly dispersed in the polymer to assure that a uniform and controlled depth of the catalyst is maintained, preferably at a high volume density with the particles being in contact with adjacent particles to form a low resistance conductive path through electrode.

Figure 3:
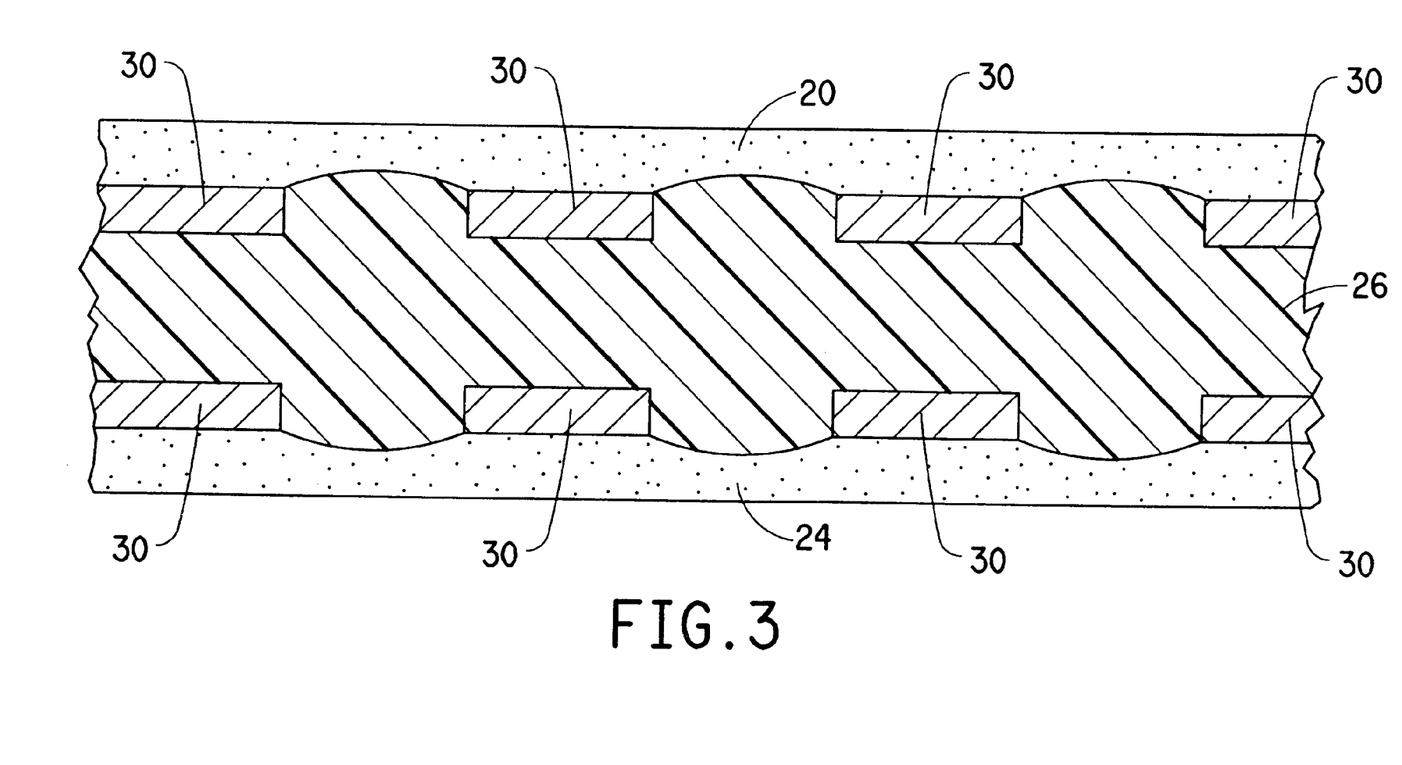
FIG. 3 is an enlarged schematic partial cross-sectional view of the membrane and electrode structure in accordance with the present invention.

As more clearly shown for a preferred embodiment in FIG. 3, the anodes 20 and cathodes 24 are formed so that they provide electrical contact with the current collector screens 30 and while also providing contact with the ion exchange layer to enable the transport of protons. Preferably, to improve the contact with the screens and the ion exchange layer, the current collector screens are partially embedded in the ion exchange polymer at the anode contact areas and the cathode contact areas so that the ion exchange polymer at least partially fills the pores of the screens. Most preferably, the ion exchange polymer extends through and protrudes from pores of the screen.

The anodes 20 and cathodes 24 are porous so that they are readily permeable to the gases (or liquids in other cell types) which are consumed or produced in cell.

Manufacturing

The invention also provides a process for making a membrane and electrode structure to be used in electrochemical cell system in accordance with the invention. With reference to the cross sectional view of FIG. 2, the process employs current collector screens 50 and sheets of thermoplastic ion exchange polymer precursor 52. The screens 50 and sheets 52 are positioned so that the screens overlap an adjacent screen to define overlapped areas 54 and so that the sheets are positioned between adjacent screens at these overlapped areas. Preferably, the screens 50 and the sheets 52 have a generally rectangular shape.

After positioning, the screens and sheets are pressed while heating to a temperature sufficient to soften the polymer so that the screens and the polymer sheets become attached and form a unitary structure similar to the structure illustrated in FIG. I (except electrodes have not been formed yet) with the screens at the overlapped areas being separated by the sulfonyl fluoride polymer. Positioning and pressing are performed so that when the structure is used, there is no electrical contact between adjacent screens.

Figure 2:
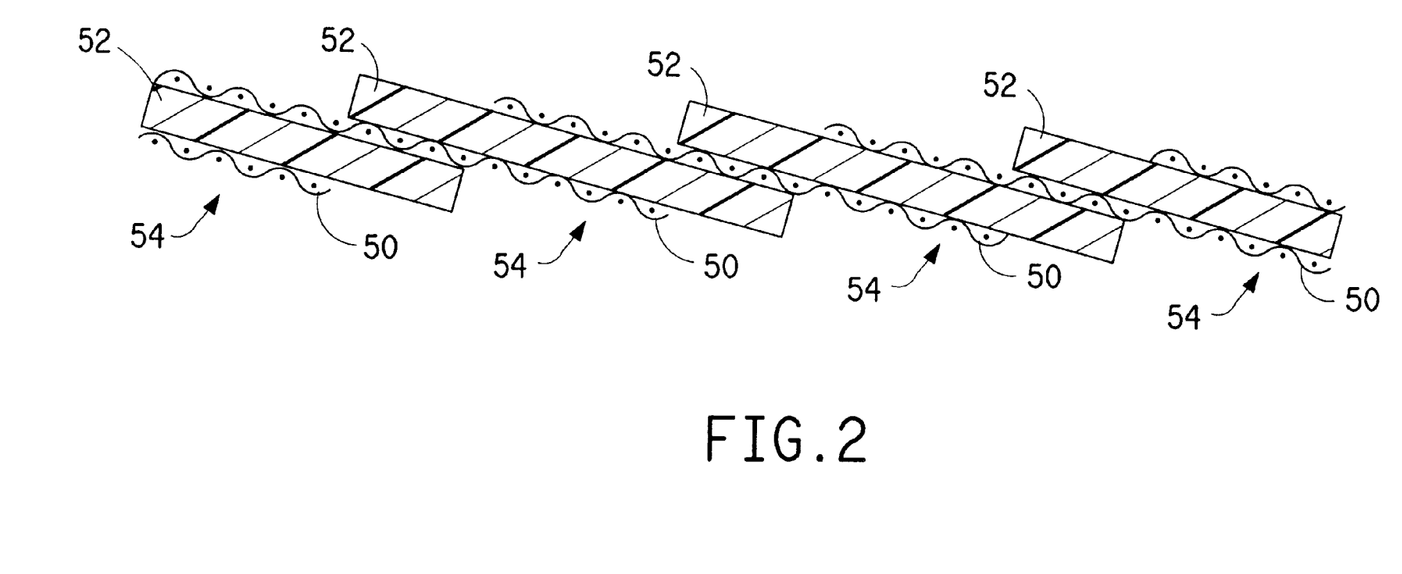
FIG. 2 is a schematic cross-sectional view of screens and sheets of ion exchange polymer precursor positioned for use in a preferred process in accordance with the present invention.

In a preferred form of the invention, the pressing causes the current collector screen 50 to be partially embedded in thermoplastic ion exchange polymer precursor at the overlapped areas so that the thermoplastic ion exchange polymer precursor partially fills the pores of the screens. Most preferably, the pressing causes the thermoplastic ion exchange polymer precursor to extend through and protrude from the pores of the screen at the overlapped areas. For highly fluorinated perfluorosulfonyl fluoride polymer, temperature during pressing to achieve desirable results preferably is in the range of about 200° C. to about 260° C. Press pressures preferably are about 2.5 MPa to about 3.4 kPa.

In another preferred form of the invention, the positioning of the sheets and screens and the pressing is performed so that the thermoplastic ion exchange polymer precursor of the sheets interpenetrates the screens at the feed through areas 32 to form a barrier to prevent the bulk flow of material across the structure. To assist in accomplishing this, it is desirable for adjacent polymer sheets to overlap each other at the feed through area 32 as shown in FIG. 2 to increase the thermoplastic polymer available to form the barrier. If a barrier is not formed, the porosity of the current collector screen would enable crossover of materials between anode and cathode at the feed through area. In this form of the invention, no additional sealing at the feed through area is required.

In a preferred form of the process of the invention, the sheets and screens are supplied from a source providing elongated sheets and screens. Suitable sources include rolls stocks or equipment which manufactures the elongated sheet and or screens as it is used in the process, e.g., extrusion equipment to manufacture the thermoplastic ion exchange polymer films. In this form of the process, positioning is performed so that the overlapped areas run along the length of the elongated sheets and screens. This is suitably accomplished by positioning the source and/or by using appropriate guides or rolls so that the sheets and screens when supplied are suitably positioned for pressing. The pressing in this form of the invention can be performed by hot lamination using a roll press or heated calender rolls or other pressing equipment which forms an elongated unitary structure which can be cut to predetermined lengths. Preferably, the sheets and screens are supplied from the source, are positioned and are pressed in a continuous operation to continuously produce elongated structure. The elongated unitary structure can be cut as it is being produced or can be stored in this form for later cutting if desired.

This unitary structure is subjected to hydrolysis to convert the thermoplastic polymer precursor into its ionic form. In the case of preferred highly fluorinated sulfonyl fluoride polymer, hydrolysis can be performed in an aqueous alkali metal hydroxide bath such a is known for use in the processing of membranes of this polymer. Preferably, a water miscible, organic liquid is employed in the bath to swell polymer to decrease the time required for hydrolysis. Compared to highly fluorinated sulfonyl fluoride films having the same thickness, hydrolysis times are longer for the unitary structures since current collector screens reduce the cross-sectional area available to the bath. In the form of the invention in which an elongated unitary structure is formed, hydrolysis may be performed on the elongated structure or it may be cut into lengths prior to hydrolysis.

The process includes forming electrodes of electrically-conductive catalyst particles in a side-by-side arrangement on the first and second sides of the unitary structure at the overlapped areas. In addition, the electrodes on the first side register with the electrodes on the second side to provide opposing electrode pairs.

The electrodes are preferably formed using an "rink", i.e., a solution or dispersion of the binder polymer and the catalyst particles, which is used to apply a coating to the overlapped areas of the structure in discrete sections with care not to extend application to electrode ink to the area between adjacent cells, i.e., the feed through area. The catalyst ink may be deposited upon the surface of the structure by any suitable technique including spreading it with a knife or blade, brushing, pouring, metering bars, spraying, screen printing, and the like. If desired, the coatings are built up to the thickness desired by repetitive application. Areas upon the surface of the membrane which require no catalyst materials, can be masked, or other means can be taken to prevent the deposition of the catalyst material upon such areas. The desired loading of catalyst upon the structure can be predetermined, and the specific amount of catalyst material can be deposited upon the surface of the membrane so that no excess catalyst is applied. The catalyst particles are preferably deposited upon the surface of a membrane in a range from about 0.2 mg/cm$^2$ to about 20 mg/cm$^2$.

When highly fluorinated sulfonic acid polymer is used as the binder in the catalyst ink, the polymer may be in solution in a fluorinated solvent when the unhydrolyzed sulfonyl fluoride form is used or, when the hydrolyzed ionic form is used, the polymer particles are dispersed in a polar liquid such as alcohol/water mixtures.

Preferably, hydrolysis is performed before the electrodes are formed on the unitary structure. In this case, the catalyst ink usually will employ the polymer in the hydrolyzed ionic form. Alternately, if an ink with the unhydrolyzed sulfonyl fluoride form is use, it may be desirable to hydrolyze after formation of electrodes so that one hydrolysis step can be used to hydrolyze both the ion exchange polymer layer and the binder in the ink.

In the form of the invention in which an elongated unitary structure is formed, it is possible to apply the electrodes to the structure prior to cutting (and also prior to hydrolysis) if desired. This form of the invention is particularly desirable when it is desired to use printing equipment or other equipment to apply the electrodes in a generally continuous fashion.

The preferred membrane and electrode structure employing metal current collector screens can be shaped into a variety of configurations such as tubes or coils or to decrease the overall size of the system. Suitable support structures are employed together with one or more the membrane and electrode structures to define an anode compartment and a cathode compartment (if present).

Generally, it is desirable to employ a seal at least at the edges of the membrane and electrode structure where it is contacted by the support structure. Preferably, the seal is formed by forming a bead of polyurethane adhesive at the edges of the membranes and electrode structure on both the anode and cathodes sides. A suitable polyurethane adhesive is available under the trademark PLYMASTER® 253 from Norwood Coated Products of Frazer, Pa. The adhesive can be applied by cutting a film of the adhesive into a desired shape to cover the periphery of the membrane and electrode structure. To attach the film to the structure, it can be pressed at about 100 psi (700 kPa) at about 200° F. (95° C.) using suitable equipment such as a heated roll press or a platen press. If desired, film can be cut so that the bead of adhesive is also be formed on the anode and/or cathode side of the membrane and electrode structure the between the electrodes at the feed through areas to assist in preventing leakage between the anode and cathode sides of the structure.

The electrochemical cell system in accordance with the invention can be employed for the electrochemical production of a variety of chemical products or as a fuel cell for the production of electricity. The system is particularly useful for fuel cells where low cost or light weight systems are needed such as for transportation use.

The invention is illustrated in the following example.

EXAMPLE

A four cell H$_2$/air fuel cell system in accordance is made using five 9.5 cm by 7.6 cm screens which are slit and expanded titanium with a thickness of 3 mil (75 $\mu$m) which has been coated with titanium nitride. As illustrated in FIG. 2, the screens are positioned with an overlap of approximately 50% of their length so that 4.8 cm is the conduction path length per cell. Four 8.25 cm by 4.8 cm sheets of perfluorinated sulfonyl fluoride polymer (TFE/PDMOF) with an EW of about 1150 (IXR-16) and a thickness of 5 mil (125 $\mu$m) are placed in the overlapped areas (adjacent sheets of polymer also overlap each other at the feed through areas by about 0.5 cm). The positioned screens and sheets are pressed at a temperature of 205° C. at a pressure of 500 psi (3.4 MPa) for 5 minutes in a platen press and then allowed to cool. These conditions resulted in the screens being partially embedded in the sulfonyl fluoride polymer at the overlapped area with the sulfonyl fluoride polymer protruding from the pores of the screens as shown in FIG. 3. The thickness of this structure is about 8 mils (200 $\mu$m). At the feed through areas, the thickness is about 10 mils (250 $\mu$m) due to the overlapping of the sulfonyl fluoride polymer in this area.

The resulting structure is hydrolyzed in an aqueous bath containing 10% KOH and 18% 2-propanol at a temperature of 65° C. Hydrolysis time is approximately 3 hours.

After hydrolysis, the structure is dried and four electrodes are formed on each side at the overlapped areas with each having an approximate area of 25%. The ink used is an aqueous/alcohol composition containing a platinum supported on carbon catalyst in which 16 percent by weight of the composition is platinum catalyst, 65 percent by weight is carbon and 19% by weight perfluorinated sulfonic acid polymer in water/alcohol mixture sold under the trademark Nafion® by E.I. du Pont de Nemours and Company containing 5% by weight (nominal) polymer particles. The electrodes are formed by screen printing the ink three times using an 86 mesh silk screen in a wood frame to print each side of the structure to produce a catalyst loading of approximately 0.4 mg/cm$^2$. The overall thickness of the membrane and electrode structure is 10–12 mils (250–300 $\mu$m).

The active area of the structure, i.e., the area with catalyst, is approximately 13 sq. in. which is about 70% of the total area of the four cell structure since at least about 0.9 cm of sealing area is needed in the feed through areas.

A seal is formed on the structure on both sides by cutting a sheet of polyurethane adhesive sold under the trademark PLYMASTER® 253 from Norwood Coated Products of Frazer, Pa, so that it covers the periphery and the feed through areas. The seal is hot laminated to the structure using heated calendar rolls at 93° C. and about 100 psi (700 kPa) pressure.

The fuel cell system is tested by clamping the membrane and electrode structure in a plastic box which provides the anode compartment.

Figure 4:
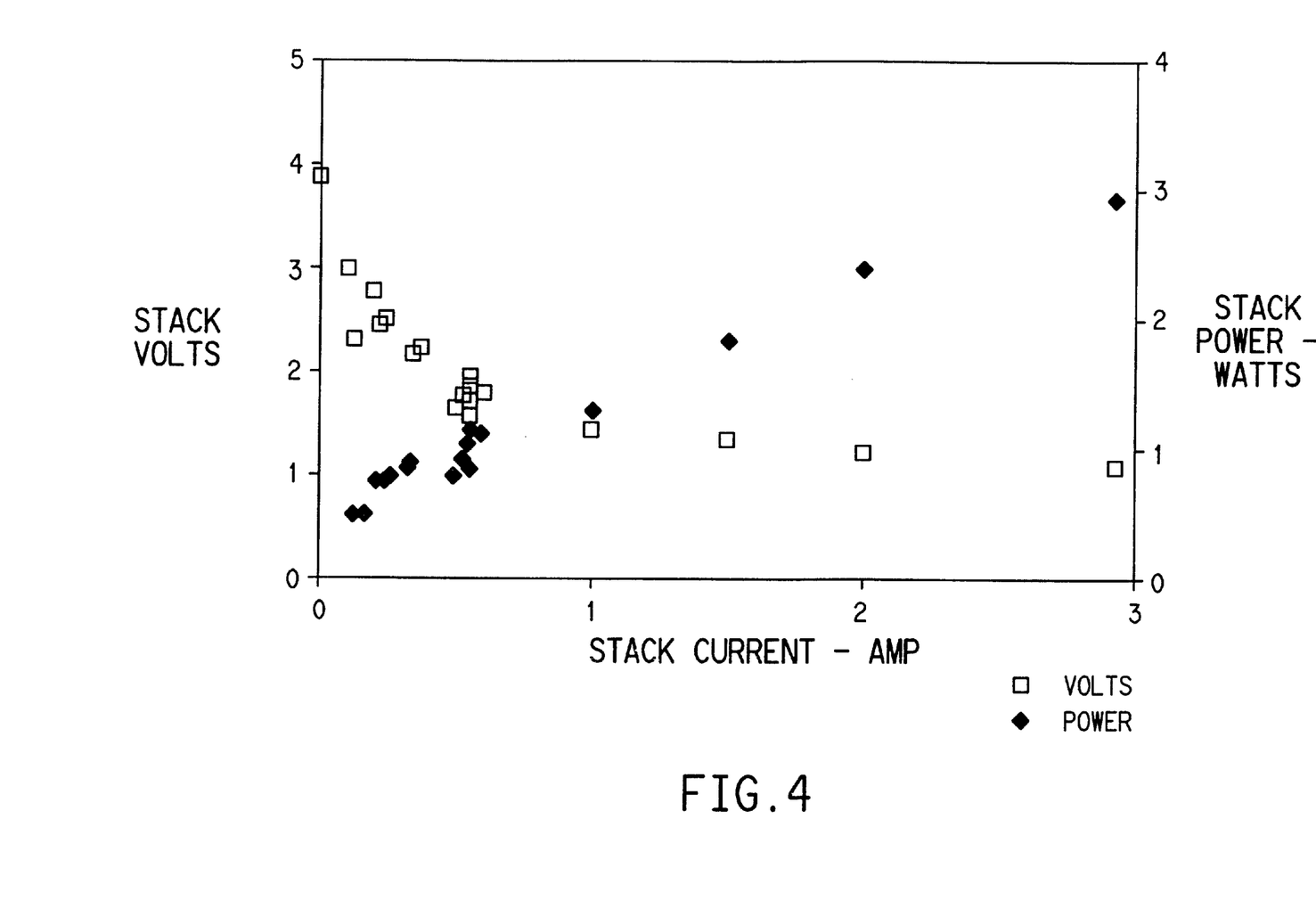
FIG. 4 is a graphical representation of voltage and power plotted against current for the fuel cell system of the Example.

Four openings are provided in the lid to expose the cathodes to the air. A plastic film is used to provide a cathode compartment around the cathodes and humidified air (saturated at 27° C.) is supplied. Hydrogen is supplied to the interior of the box and the cell is run at various current densities. Contacts are provided on each of the four cells to measure individual cells performance and the cell voltage and power versus current density are shown in FIG. 4. Open circuit voltages for cell No. 1 is 0.98 V, No 2. 0.92 V, No. 3 is 0.94 V and No.4 is 0.95 V.

What is claimed is:

1. An electrochemical cell system comprising an anode compartment and a cathode compartment separated by a membrane and electrode structure having a anode surface with a plurality of anodes in a side-by-side arrangement exposed to the anode compartment and a cathode surface with a plurality of cathodes in a side-by-side arrangement exposed to said cathode compartment, said anodes and cathodes comprising electrically-conductive catalyst particles, said anodes and cathodes being separated by a layer of ion exchange polymer and registering so that opposing pairs of anodes and cathodes form cells, said membrane and electrode structure further comprising a plurality of current collector screens, said current collector screens having an anode contact area in contact with said anode, a cathode contact area in contact with said cathode and a feed through area extending between cells and crossing from said anode contact area to said cathode contact area to connect the anode and cathode of adjacent cells.

2. The electrochemical cell system of claim 1 wherein said current collector screens have an open area of about 55% to about 65%.

3. The electrochemical cell system of claim 1 wherein said screens are flexible.

4. The electrochemical cell system of claim 1 wherein said current collector screens are made of metal.

5. The electrochemical cell system of claim 4 wherein said current collector screens are made of slit and expanded titanium sheets.

6. The electrochemical cell system of claim 5 wherein said slit and expanded titanium metal sheets have a coating of titanium nitride.

7. The electrochemical cell system of claim 1 wherein said current collector screens provide at least a single layer of reinforcement to said membrane and electrode structure over at least about 93% of the area of said structure.

8. The electrochemical cell system of claim 1 wherein a single current collector screen is the sole electrical conductor between adjacent cells.

9. The electrochemical cell system of claim 1 wherein said current collector screens are partially embedded in said ion exchange polymer at said anode contact areas and said cathode contact areas so that said ion exchange polymer at least partially fills the pores of said screens.

10. The electrochemical cell system of claim 9 wherein said ion exchange polymer extends through and protrudes from said pores of said screen.

11. The electrochemical cell system of claim 10 wherein ion exchange polymer interpenetrates said screens at said feed through areas to form a barrier to prevent the bulk flow of materials between said anode compartment and said cathode compartment.

12. The electrochemical cell system of claim 1 wherein said ion exchange polymer is highly fluorinated sulfonic acid polymer.

13. The electrochemical cell system of claim 1 further comprising a seal attached to at least the periphery of the membrane and electrode structure.

14. The electrochemical cell system of claim 13 wherein said seal is attached to said feed through areas on at least said cathode or said anode side of said membrane.

15. The electrochemical cell system of claim 13 wherein said seal is polyurethane adhesive.

16. The electrochemical cell system of claim 1 operated as a fuel cell system.

17. A process for making a membrane and electrode structure comprising:

positioning conductive screens and sheets of thermoplastic ion exchange polymer precursor so that said screens overlap an adjacent screen to define overlapped areas and so that said sheets are positioned between adjacent screens at said overlapped areas;

pressing said screens and sheets while heating to a temperature sufficient to soften said polymer so that said screens and said polymer sheets become attached and form a unitary structure having first and second surfaces, said screens at said overlapped areas being separated by said ion exchange polymer precursor;

hydrolyzing said ion exchange polymer precursor; and forming a plurality of electrodes of electrically-conductive catalyst particles in a side-by-side arrangement on said first and second sides of said unitary structure at said overlapped areas, said electrodes on said first side registering with said electrodes on said second side to provide opposing electrode pairs.

18. The process of claim 17 where in said screens and said sheets have a generally rectangular shape.

19. The process of claim 17 wherein said pressing causes said current collector screen to be partially embedded in thermoplastic ion exchange polymer precursor at said overlapped areas so that said thermoplastic ion exchange polymer precursor partially fills the pores of said screens.

20. The process of claim 17 wherein said pressing causes said thermoplastic ion exchange polymer precursor to extend through and protrude from said pores of said screen at said overlapped areas.

21. The process of claim 17 wherein said positioning of said sheets and screens and said pressing is performed so that said thermoplastic ion exchange polymer precursor of said sheets interpenetrates said screens at said feed through areas to form a barrier to prevent the bulk flow of material across said structure.

22. The process of claim 21 wherein adjacent polymer sheets overlap at said feed through area to increase the thermoplastic polymer available to form a barrier to prevent the bulk flow of material across said structure.

23. The process of claim 17 wherein said pressing is performed at a temperature of about 200 to about 260° C.

24. The process of claim 17 wherein said hydrolyzing is performed before said electrodes are formed on said unitary structure.

25. The process of claim 17 wherein said screens have an open area of about 55% to about 65%.

26. The process of claim 17 wherein said current collector screens and said sheets of ion exchange polymer precursor are dimensioned so that said screens form at least a single layer of reinforcement to said membrane and electrode structure over at least about 93% of the area of said structure.

27. The process of claim 17 wherein said screens are flexible.

28. The process of claim 17 wherein said current collector screens are made of metal.

29. The process of claim 28 wherein said current collector screens are made of slit and expanded titanium sheets.

30. The process of claim 29 wherein said slit and expanded titanium metal sheets have a coating of titanium nitride.

31. The process of claim 17 wherein said sheets and screens are supplied from a source providing elongated sheets and screens and said positioning is performed so that said overlapped areas run along the length of said elongated sheets and screens, said pressing being performed so that said sheets and screens are pressed to form an elongated unitary structure, said process further comprising cutting said elongated unitary structure into predetermined lengths.

32. The process of claim 31 wherein said sheets and screens are supplied from said source, are positioned and are pressed continuously.

33. The process of claim 17 further comprising forming a seal on said membrane and electrode structure by cutting a film of polyurethane adhesive to contact at least the periphery of said structure and pressing while heating to attach said film to said structure.

* * * * *